July 11, 1961

M. GONDOUIN 2,992,389

WELL LOGGING SYSTEM

Filed June 25, 1956

INVENTOR.
MICHEL GONDOUIN

BY William R. Sherman

HIS ATTORNEY

July 11, 1961 M. GONDOUIN 2,992,389
WELL LOGGING SYSTEM
Filed June 25, 1956 4 Sheets-Sheet 2

INVENTOR.
MICHEL GONDOUIN
BY *William R. Sherman*
HIS ATTORNEY

United States Patent Office 2,992,389
Patented July 11, 1961

2,992,389
WELL LOGGING SYSTEM
Michel Gondouin, Ridgefield, Conn., assignor, by mesne assignments, to Schlumberger Well Surveying Corporation, Houston, Tex., a corporation of Texas
Filed June 25, 1956, Ser. No. 593,506
18 Claims. (Cl. 324—7)

The present invention relates to apparatus for electrical measurements within a conductive fluid medium and, more particularly, to apparatus for obtaining indications dependent upon the occurrence of spontaneous potentials in a borehole traversing earth formations. More specifically, the invention is concerned with apparatus of this character by which the depth and thickness of permeable and impervious formations may be ascertained in a highly effective manner.

In the present practice, the location and vertical extent of permeable formations traversed by a borehole are usually determined by well logging methods of the type disclosed in Patent No. 1,913,293 to Conrad Schlumberger. According to the methods described in that patent, indications are obtained of naturally occurring or spontaneous potentials between an electrode moved through the borehole and a suitably chosen point of reference. It has been found that interpretation of these spontaneous potentials, hereinafter designated as SP, is rather difficult in some cases such as, for example, in highly resistive formations. A full discussion of this problem appears in a paper by Henri-Georges Doll entitled "The SP Log: Theoretical Analysis and Principles of Interpretation," which was published in the September 1948 issue of "Petroleum Technology." Further, except where the formations are of great thickness, the conventional SP log does not provide indications of the so-called "static SP" of a formation. The latter term, which was coined by H. G. Doll and referred to in his Patent No. 2,592,125, can be defined as the total E.M.F. causing the flow of the spontaneous currents in the borehole.

In the method of this Patent No. 2,592,125, indications are obtained of the potential difference between an electrode and a reference point as the electrode is moved to different positions in the borehole. By introducing current from points above and below the electrode in response to the potential gradient along the borehole in the vicinity of the electrode, the potential gradient along the borehole in this vicinity is maintained substantially at zero. However, as the potential gradient is dependent upon the flow of SP current along the borehole through conductive fluid contained therein, the gradient in regions where the SP current is relatively slight may be of such small value as to render its detection rather difficult.

The flow of SP current may be detected without the requirement of measuring the potential gradient along the borehole, through the use of a single toroidal coil. Since the SP current at any given depth in a borehole is steady and unidirectional, although it varies in magnitude and direction at points along the borehole, a potential may be induced in the winding of the toroidal coil only when the coil is moved along the borehole, as taught in E. G. Leonardon Patent No. 2,297,568. Because the magnitude of the induced potential is dependent on the speed of movement of the toroidal coil, however, regulation of the logging speed is necessary for accurate measurements and, moreover, a high logging speed may be required for detection of an adequate signal.

Accordingly, it is the object of the present invention to provide novel apparatus for detecting the flow of direct current in a column of conductive fluid without necessitating rapid movement with respect to the fluid.

Another object of the invention is to provide novel apparatus of the above character responsive to current which is caused to flow in conductive fluid within a borehole by naturally occurring or spontaneous potentials in the traversed earth formations.

A further object of the present invention is to provide novel apparatus for obtaining "static SP" logs directly from logging operations in a well.

In accordance with the invention, at least one saturable magnetic core is disposed within conductive fluid and has a passage containing conductive fluid to provide a path for direct current. In a borehole, the passage may be oriented to provide a path for current caused to flow by spontaneous potentials in the traversed formations. Each core is driven alternately between its opposite states of saturation to induce in a winding a pulse having a time occurrence dependent upon the magnitude and direction of the current flowing through the passage.

In one embodiment, a pair of toroidal coils are spaced along a passage and are driven in out of phase relation alternately between their opposite states of saturation. In response to a potential induced in windings on the cores, a direct current is generated which has a magnitude and sign corresponding to the magnitude and sign of the direct current to be measured. In another embodiment, a potential is applied between electrodes at either end of the passage in response to the potential induced in the coil windings, so that substantially no current flows through the conductive path. The potential difference picked up between a point along the conductive path and a suitably placed reference point is thus caused to represent the static SP. In another embodiment, one or more toroidal coils spaced along the passage are energized in response to the induced potential to induce a flow of current nullifying the SP current through the passage during a periodic interval. In these intervals, the potential difference between a point along the passage and a remote reference point is picked up to derive a signal representing the static SP. In yet another modification, a single saturable magnetic core affording two passages is provided in lieu of the pair of saturable toroidal cores.

The invention may be better understood from the following detailed description of several typical embodiments thereof, taken in conjunction with the accompanying drawings, in which.

Figure 1:
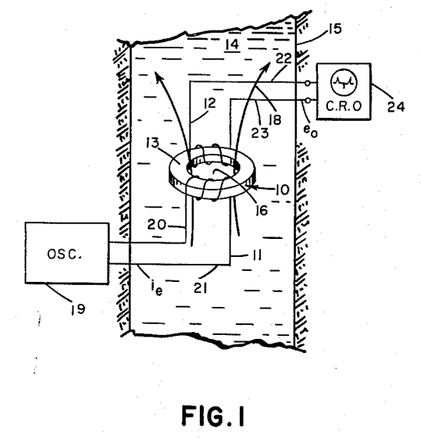
FIG. 1 is a schematic diagram of apparatus illustrating the principles of the invention.

To exemplify the principles of the invention, there is shown in FIG. 1 a toroidal coil 10 including a primary winding 11 and a secondary winding 12 wound on a toroidal core 13 composed of a saturable magnetic material, such as a nickel-iron alloy, having a substantially square hysteresis loop characteristic. The coil 10 may be shielded in a suitable manner and covered with insulation so that it may be immersed in a column of electrically conductive fluid 14 contained within a generally cylindrical wall 15, such as a borehole wall.

The toroidal coil 10 has a passage 16 through it which is oriented in the direction of the column of conductive fluid, such passage 16 containing the conductive fluid so as to provide a conductive path for ionic current flowing along the column of fluid. The core 13 thus encircles this conductive path and lies in a plane transverse to the conductive path and to the axis of the fluid column. The flow of unidirectional current along the conductive path is indicated by arrows 18.

To drive the saturable core 13 between its opposite states of saturation, an electric current source such as oscillator 19 has its output terminals connected by insulated conductors 20, 21 to the terminals of primary winding 11. When energized, the oscillator 19 passes an alternating current $i_e$, which may be of sinusoidal form, through the primary winding 11. To derive a signal representing the magnitude and direction of the D.C. current I flowing through the passage 16, insulated conductors 22, 23 connect the terminals of the secondary winding 12 to a circuit upon which the potential $e_0$ induced in the secondary winding is to be impressed. While such circuit may simply comprise a cathode ray oscilloscope 24 to display the output signal $e_0$ as a function of time, more elaborate circuits are contemplated which are described hereafter.

Figure 2:
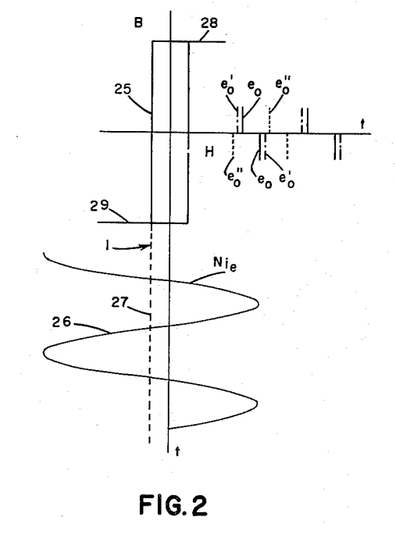
FIG. 2 is a graphical representation of the electrical and magnetic relationships characterizing the apparatus of FIG. 1.

Referring now to FIG. 2, the rectangular hysteresis loop 25 characterizing the material of toroidal core 13 is shown plotted as a function of the magnetomotive force H and flux density B. The magnetomotive force created by the flow of energizing current $i_e$ in the N turns of the primary winding 11 is represented by curve 26 plotted along the ordinate axis as a function of time $t$. The current I flowing in the conductive path through the toroidal coil 10 also contributes a magnetizing force, the conductive path being, in effect, a single turn primary winding. Assuming that the current I has a steady value, it is represented by a straight line 27 displaced from the ordinate axis in a direction to represent the polarity of the current. The curve 26 is similarly displaced so as actually to represent the variations in total magnetomotive force applied to the core 13. The excursions of the curve 26 are seen to extend into the opposite saturation states 28, 29 represented by the B-H characteristic 25. The rapid transition between these opposite states resulting from the rectangular form of the hysteresis loop produces pulses of induced potential $e_0$ which are plotted along the abscissa axis as a function of time and are represented by solid lines.

In the absence of the steady current I flowing through the conductive path in passage 16, an induced output potential $e_0'$ is obtained, which is represented by dot-dash lines indicating pulses displaced from the pulses $e_0$ along the time axis. The positive $e_0$ pulse is seen to lag the positive $e_0'$ pulse, while the negative $e_0$ pulse leads the negative $e_0'$ pulse. Upon consideration, it will be evident that the amount of displacement of the $e_0$ pulses is dependent upon the magnitude of the direct current I and the sense of the displacement is dependent upon the polarity of the current I. That is to say, the output potential $e_0$ induced in the secondary winding 12 of the toroidal coil 10 has a time occurrence which represents both the magnitude and polarity of the electric current flowing through the passage 16 provided by the toroidal coil. The output signal $e_0$ may, therefore, be directly indicated to provide a measure of the direct current I. However, to understand the manner in which the output signal $e_0$ is utilized in the embodiments of the invention to be described hereafter, consider the time occurrence of output pulses $e_0''$ when the energizing current $i_e$ is reversed in phase. In lieu of a positive $e_0$ pulse lagging the positive $e_0'$ pulse, there is obtained a negative $e_0''$ pulse leading the positive $e_0'$ pulse. The subsequent $e_0''$ pulse, which is indicated by a dotted line, is positive and lags the negative $e_0'$ pulse, that is, the pulse which would be obtained in the absence of any direct current I. By suitably combining the $e_0$ pulses and the $e_0''$ pulses, there is obtained a succession of alternating pulses, the frequency of alternation being twice that of the alternating current $i_e$. When suitably filtered, the amplitude of this double frequency output signal provides a measure of the magnitude of the direct current I, and its phase corresponds with the polarity of the direct current I.

Figure 3:
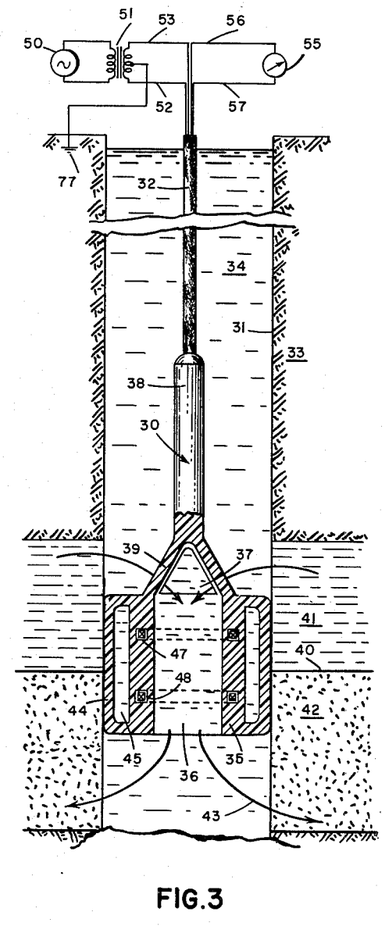
FIG. 3 is a schematic diagram of a typical well logging system constructed according to the invention.

Utilizing these principles of the invention is an electrical well logging system shown in FIG. 3 as including portions within a housing 30 arranged to be lowered into a borehole 31 and portions at the surface of the earth. The housing 30 is supported by an electric cable 32 and may be moved thereby past earth formations 33. Contained within the borehole 31 is a suitable electrically conductive fluid 34, such as salt water, a water base drilling mud or other electrolyte.

The housing 30 includes a tubular portion 35 having a passage 36 therethrough extending along the borehole and open at either end. To afford an opening 37 at the upper end, the tubular portion 35 is supported from a reduced diameter portion 38 of the housing dependently by means of spaced arms 39. Thus, the passage 36 is open to receive the conductive fluid 34 and provide for relative movement of the conductive fluid when the housing is raised or lowered.

Due to the presence of conductive fluid within the passage 36, an electrically conductive path is afforded ionic current, such as naturally occurring direct current which is caused to flow by spontaneous potentials in the formations traversed. To illustrate a typical occurrence of spontaneous potentials, the annular portion 35 is shown to extend across boundary 40 between an upper shale formation 41 and a lower sand formation 42. At the boundary 40 a spontaneous potential is produced which is of a polarity to cause direct current to flow from the shale formation 41 through the conductive fluid 34 into the sand formation 42, as indicated by the arrows 43.

In order to promote a flow of this direct current through the passage 36 rather than around the tubular portion 35 and at the same time to allow relatively free movement of the housing 30 through the borehole, resilient sealing means are provided about the tubular portion 35 which may take the form of a flexible annular wall portion 44 integral along its upper and lower margins with the tubular portion 35 and spaced from the tubular portion 35 intermediate its length by an annular cushioning chamber 45. While other sealing arrangements may be provided, the sealing wall 44 may effectively minimize short-circuit paths around the passage 36 which otherwise would be afforded by the presence of an annulus of conductive fluid.

To detect the magnitude and direction of the SP current flowing through the passage 36, toroidal coils 47, 48 are spaced along the passage in encircling relation therewith so as to have their axes coincident and directed along the borehole. The conductive path provided by conductive fluid in the passage 36 thus extends through the toroidal coils 47, 48 and, in effect, forms a one turn primary winding linking each of the coils. Preferably, the surface of the housing 30 including the annular portions 35 and 44 and the arms 39 is composed of electrically insulating material, such as rubber or a rubber substitute, so that the path of the SP current through the toroidal coils is defined by insulating surfaces. Conveniently, the annular portion 35 may be composed entirely of a rubber-like insulating material surrounding and thereby protecting the toroidal coils 47, 48.

At the surface of the earth, electric source means such as an A.C. generator 50 is coupled by transformer 51 to the upper terminals of cable conductors 52, 53 to supply power to the toroidal coils and detecting circuits coupled therewith. Suitable indicating means, such as a galvanometric recorder 55 of the type commonly employed in well logging may be connected by cable conductors 56, 57 so as to provide a remote surface indication of the detected value of the SP current, preferably as a function of depth.

Figure 4:
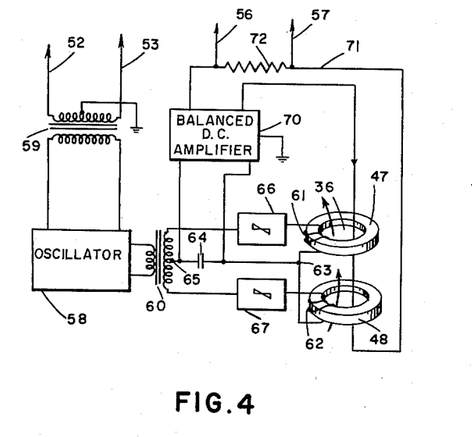
FIG. 4 is a schematic diagram illustrating circuitry employed with the system of FIG. 3.
Figure 5:
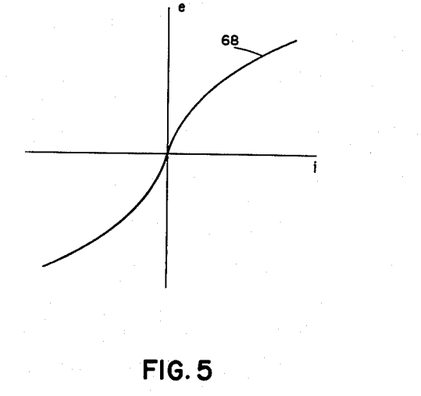
FIG. 5 is a graphical representation of the non-linear characteristics of elements employed in the circuit of FIG. 4.

Referring now to FIG. 4, the detecting circuit is shown to include an oscillator 58 having its input terminals coupled by a transformer 59 to the lower terminals of cable conductors 52, 53 and its output terminals coupled by transformer 60 to windings 61 and 62 of the respective toroidal coils 47 and 48. These toroidal coils 47, 48 may be constructed in a manner similar to toroidal coil 10 of FIG. 1 but without separate secondary windings. The junction 63 of the windings 61, 62 is connected by capacitor 64 to the midtap 65 of the secondary winding of transformer 60, while the other terminals of the windings 61, 62 are connected respectively by similar non-linear networks 66, 67 to the outer terminals of the secondary winding of transformer 60. If desired, the networks 66, 67 may comprise thyrite resistors although networks comprising appropriately biased diodes may be preferred for temperature stability. Suitable voltage-current characteristics for the non-linear devices are represented by parabolic curve 68 inverted at the origin, which is plotted in FIG. 5 to represent potential $e$ as a function of current $i$. Because of the balanced connection of the coils 61 and 62 to the secondary winding of transformer 60, it will be apparent that these coils are excited in phase opposition. The coils are wound on the toroidal cores in opposite sense to cause the flux produced in the cores to circulate around the passage 36 in opposite directions.

Across the capacitor 64, a D.C. potential is produced which has a polarity and magnitude corresponding to the polarity and magnitude of the SP current. This potential difference is coupled to the input terminals of a balanced D.C. amplifier 70 which may be of any suitable design, preferably having a relatively high gain and low drift. For best operation, the input to the amplifier may be filtered. The output terminals of amplifier 70 are connected to a balancing circuit provided by insulated conductor 71 and a series resistor 72. The balancing circuit is inductively coupled with the toroidal coils 47, 48 by a single turn loop provided by the conductor 71. Under conditions of balance, a D.C. current is circulated through the balancing circuit which is equal and opposite to the SP current and produces a potential drop across resistor 72 representing the SP current. This potential drop is applied by cable conductors 56, 57 to the indicating device 55.

In operation, the housing 30 is moved along the borehole past formations to be investigated and a record provided by indicating device 55 is correspondingly advanced. Oscillator 58 is energized to drive the toroidal cores between their opposite states of saturation, each of the cores being in the same state of saturation at any given instant. That is to say, at any instant when the cores are in a state of saturation, the magnetic flux circulates the cores in opposite directions relative to passage 36. By using a saturable core material which has a substantially rectangular characteristic, transitions between saturation states occur in a short instant relative to the period of the energizing current. In each of the windings 61, 62, therefore, current surges arise in the form of time displaced pulses, the trains of such pulses from both toroidal coils, when combined, having a fundamental frequency twice that of the driving voltage. Because of the square law characteristic of the thyrite or diode networks, the pulse trains produce across capacitor 64 an average D.C. potential which corresponds to the magnitude of the D.C. current linking the toroidal coils 47, 48 and likewise corresponds in polarity.

While this potential may be taken as a measure of the SP current, absent the balancing circuit 71, a more accurate measurement is obtained by circulating a current through the balancing circuit conductor 71 which has a magnitude and polarity serving to reduce substantially to zero the D.C. potential across capacitor 64. Such an opposing current is provided at the output of balanced D.C. amplifier 70 in response to the potential across capacitor 64, which is applied to its input circuit. Since the potential drop in resistor 72 is proportional to the balancing current and has a corresponding polarity, indications obtained with the recorder 55 are accurately representative of both the magnitude and polarity of the SP current at the depth of the toroidal coils 47, 48.

The indications of SP current obtained with recorder 55 have a significance which is analogous to the so-called selective SP logs obtained in accordance with the teachings of H. G. Doll Patent No. 2,712,626 and may be similarly utilized to obtain computed values of static SP, in the manner described in this Doll patent.

Figure 6:
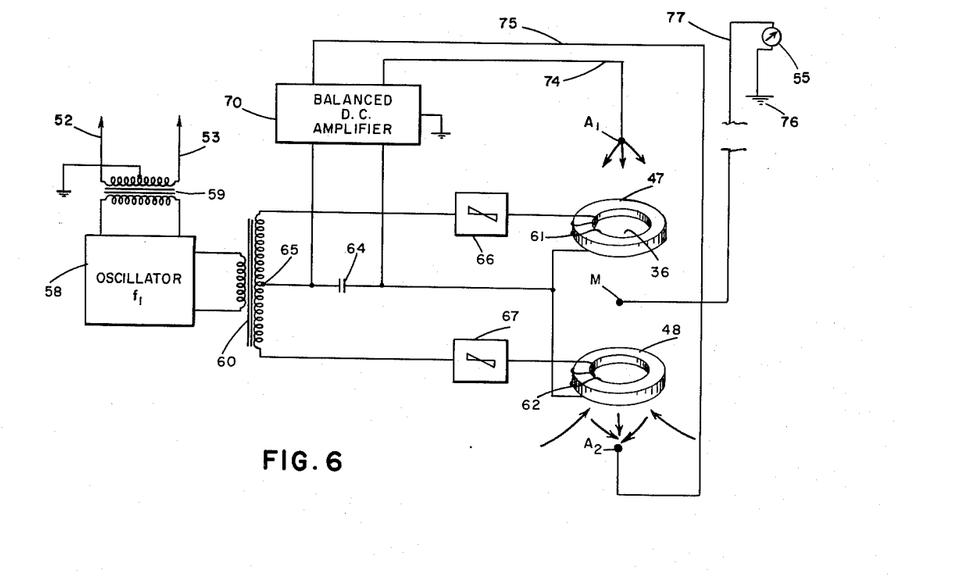
FIG. 6 is a schematic diagram of a modification of the invention by which a static SP log is provided.

To obtain a static SP log without a requirement of computation, there is provided in accordance with the invention an embodiment illustrated in FIG. 6. Portions of the circuit which are similar to those described heretofore are designated by corresponding reference numerals. In lieu of a balancing circuit, the output of balanced D.C. amplifier 70 is connected by insulated conductors 74, 75 to electrodes $A_1$ and $A_2$ spaced, respectively, at the upper and lower ends of the passage 36. These electrodes $A_1$, $A_2$ are thus disposed in the path of SP current which is directed through the passage 36 and are spaced along the passage so that a D.C. potential gradient may be established tending to oppose the flow of the SP current. At a point intermediate the electrodes $A_1$ and $A_2$ along the passage 36 is disposed an electrode M for picking up the absolute potential with respect to a remote reference point 76. Indications of this absolute potential are obtained by connecting one terminal of recorder 55 via cable conductor 77 with electrode M and the other terminal to the remote reference or ground point 76.

In an exemplary operation of the embodiment of the invention depicted in FIG. 6, the oscillator 58 is energized as the housing 30 is moved through the borehole, thereby to drive the toroidal coils 47, 48 between their opposite states of saturation. If direct current is passing along the conductive path afforded by passage 36 through the toroidal coils, a D.C. potential is developed across capacitor 64 having a corresponding magnitude and polarity, in the manner described above. In response to this potential difference across capacitor 64, the D.C. amplifier 70 impresses a potential difference between electrodes $A_1$ and $A_2$ having a polarity tending to establish a D.C. potential gradient through the passage 36 opposing the flow of the direct current. Since the electrodes $A_1$ and $A_2$ are in electrical contact with the conductive fluid 34, a D.C. current is passed between them. However, this D.C. current is not necessarily equal and opposite to the SP current which otherwise would be conducted through the passage 36.

Instead, a condition of zero potential gradient along the passage 36 is established which corresponds with the substantial absence of flow of any D.C. current through the passage. Since the measuring electrode M is then disposed in a region of zero potential gradient along the borehole and yet in electrical communication with the adjacent formations through the conductive fluid 34, the indications of absolute potential of electrode M obtained with recorder 55 are a static SP log, as the same is defined in the above referred to paper by H. G. Doll and in the above-mentioned H. G. Doll Patent No. 2,592,125.

Figure 7:
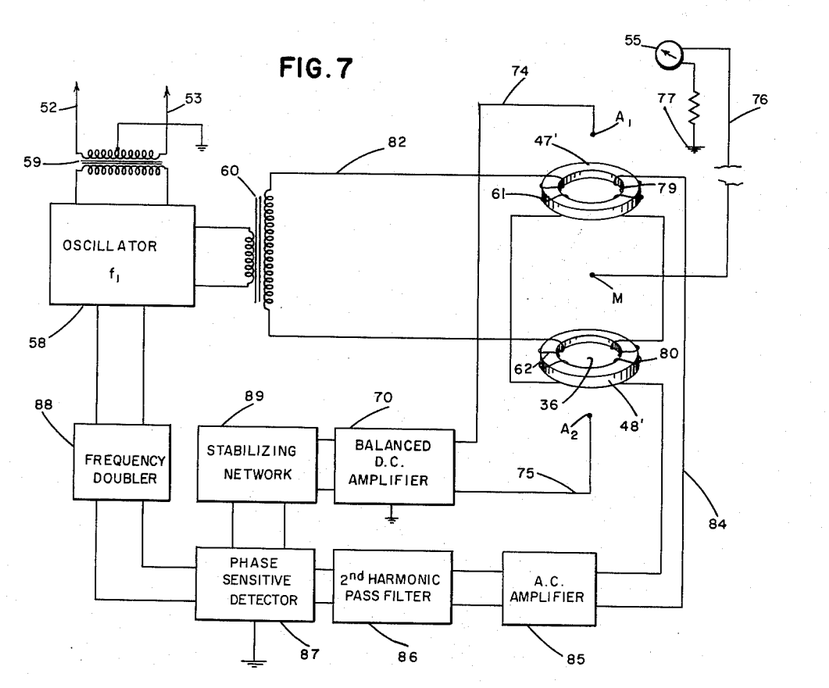
FIG. 7 is a schematic diagram of a modification of the circuitry of FIG. 6.

The static SP log may alternatively be obtained using circuitry illustrated in FIG. 7 and representing another form of the invention. Toroidal coils 47', 48' are employed in this form of the invention which are identical with the toroidal coils 47, 48 described above except for the addition of the respective secondary windings 79, 80 which are wound on the coils 47', 48' in the same direction and are series connected in aiding relation. It may be noted too that the primary windings 61 and 62, while wound on the toroidal cores in the same direction, are connected in series opposing relation by conductor 82 across the terminals of the secondary winding of transformer 60.

The secondary windings 79, 80 are connected in series aiding relation by conductor 84 across the input terminals of an A.C. amplifier 85 of suitable design and preferably having a relatively broad pass band. The output terminals of the A.C. amplifier 85 are coupled to the input terminals of a filter 86 which is designed to pass signals at a frequency which is the second harmonic of the frequency to which the oscillator 58 is tuned. From the pass filter 86 is derived a signal which is of substantially sinusoidal form and has double the frequency of the oscillator 58, this signal being supplied to the input circuit of a phase-sensitive detector 87. While the phase-sensitive detector may be of any suitable design, such as that shown at pages 254–255 of the April, 1951 issue of "Review of Scientific Instruments" in an article by N. A. Schuster, it may be sufficient to characterize the phase-sensitive detector as of the balanced type, that is, having a rectified output of either polarity. The detector 87 is sensitized by a reference signal supplied from frequency doubler 88 which is coupled to the output of oscillator 58. Accordingly, the output of the phase-sensitive detector 87 is a rectified version of the second harmonic induced in the secondary winding 79, 80 and has a polarity dependent on the phase relationships of this second harmonic signal and the reference signal from the frequency doubler 88. This output signal of reversible polarity is supplied to the input circuit of a stabilizing network 89 and is then coupled to the input circuit of balanced D.C. amplifier 70. The connection of the output circuit of balanced D.C. amplifier 70 is, as described before, of such polarity that the potential difference established between electrodes $A_1$ and $A_2$ tends to produce a substantially zero potential gradient along the passage 36 in the vicinity of the electrode M.

In an exemplary operation of the apparatus of FIG. 7, the oscillator 58 is energized to drive the toroidal coils 47′, 48′ between their opposite limits of saturation with the coils being in opposite states of saturation at any given time. In the manner explained in conjunction with the descriptions of FIGS. 1 and 2, there is derived from the series aiding secondary windings 79, 80 on coils 47′, 48′ a train of pulses of alternating polarity, the rate of alternation being twice the frequency of the current supplied to the primary windings. This pulse train is amplified and filtered to obtain a second harmonic signal of sinusoidal wave shape and having an amplitude determined by the time displacement of the pulses and corresponding to the magnitude of any current flowing through the passage 36. The phase of this second harmonic signal is further related to the phase of the second harmonic reference signal from frequency doubler 88 to correspond with the polarity of any direct current flowing through the passage 36.

By polarizing the phase-sensitive detector 87 at a reference phase angle determined by the output of frequency doubler 88, the signal supplied to the balance D.C. amplifier 70 has a polarity and magnitude corresponding to the residual D.C. current flowing through the passage 36. In the manner of a degenerative feedback signal, the output of the D.C. amplifier 70 applied as a potential difference between electrodes $A_1$ and $A_2$ tends to reduce the residual D.C. current in passage 36 towards zero. The stabilizing network 89 simply serves to ensure stability of the degenerative feedback control loop in which it is connected.

By establishing a condition of zero potential gradient along the passage 36 and in the vicinity of the measuring electrode M, the potential difference picked up between the measuring electrode M and remote reference point 77 yields a static SP log on the record of indicating device 55. In contrast to the apparatus in FIG. 6, the apparatus of FIG. 7 may provide a static SP log with a higher sensitivity and stability of operation.

Figure 8:
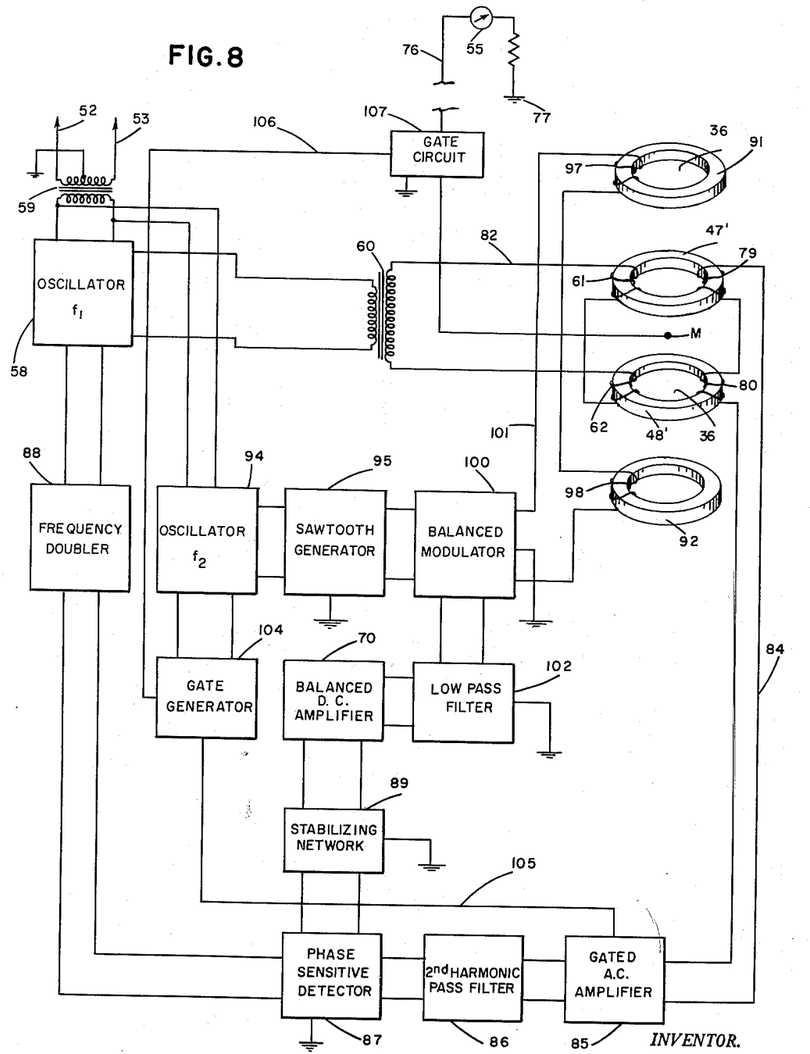
FIG. 8 is a schematic diagram of another embodiment of the invention illustrating the use of toroidal coils in lieu of electrodes which are shown in the system of FIG. 7.

Referring now to FIG. 8, there is shown an embodiment of the invention wherein a zero potential gradient along the passage 36 is obtained by suitably energizing torodial coils 91, 92 which are spaced along the passage 36 above and below torodial coils 47′, 48′. In contrast to the torodial coils 47′, 48′ the core material of the torodial coils 91, 92 has a relatively high permeability but not a rectangular hysteresis characteristic. It will be appreciated that a torodial coil cannot serve continuously to maintain a zero potential gradient or to promote the flow of a continuous D.C. current in a direction opposing the SP current. The apparatus of FIG. 8 is therefore arranged to achieve a zero potential gradient along the passage 36 during recurrent measuring intervals.

To this end, an oscillator 94 has its input terminals coupled to the secondary winding of transformer 59 so as to be energized to produce an oscillatory signal at frequency $f_2$, which is different from the frequency $f_1$ generated by oscillator 58. A signal at the second frequency $f_2$ is supplied to a sawtooth generator 95 to obtain a sawtooth wave for energizing primary windings 97, 98 which are wound in similar directions on torodial coils 91 and 92, respectively. The so-called ramp portion of the sawtooth wave serves, in passing through the series aiding windings 97, 98, to establish a magnetic flux similarly directed around each core of the coils 91, 92 and the time derivative of which is constant corresponding with the slope of the ramp portion of the wave. Such a time linear flux tends to induce a constant flow of unidirectional current.

In order to induce a flow of current through the balancing coils 91, 92 which is equal and opposite to the flow of naturally occurring SP currents, a balanced modulator 100 is coupled between the output of sawtooth generator 95 and the windings 97, 98, these windings thus being connected by a conductor 101 in series aiding relation across the output terminals of the modulator 100. To control the amplitude and phase of the sawtooth wave derived from modulator 100, the output of balanced D.C. amplifier 70 is coupled through a low pass filter 102 to the modulating signal input circuit of the modulator 100.

While a balance may be achieved during the ramp portion of the sawtooth waves tending to establish a zero potential gradient along the passage 36, the sharp decay of the sawtooth wave results in a large transient which is desirably excluded from both the feedback control loop and the measuring circuit. Accordingly, the output of oscillator 94 is coupled to a gate generator 104 which supplies a gate signal via conductor 105 to the A.C. amplifier 85 in the feedback loop. The occurrence and duration of the gate signal is synchronized with the ramp portion of the sawtooth wave so as to unblock the A.C. amplifier 85 for a measuring interval which is substantially free of transients arising from decay of the sawtooth wave. A gate pulse of similar time occurrence and duration is supplied via conductor 106 to a gate circuit 107 interposed in the measuring circuit provided by cable conductor 76. The gate circuit 107 may be of a type serving to clamp the measuring circuit at ground potential except when unblocked by the gate pulse from gate generator 104, there being a variety of well known circuits for accomplishing this end.

The operation of the apparatus of FIG. 8 is basically similar to that of apparatus shown in FIG. 7. However, the output of the balanced D.C. amplifier 70 serves, not to impress a corrective potential difference along the passage 36 directly, but rather to control the amplitude and phase of the sawtooth wave from generator 95 in such a manner that flux created in the torodial coils 91, 92 tends to establish a potential gradient along the passage 36 opposing the flow of SP current through the passage.

Because both the feedback circuit and the measuring circuit are unblocked only during an intermediate portion of the ramp output form sawtooth generator 95, the low pass filter 102 is connected in the feedback loop to yield an average, substantially continuous modulating signal to control the output of balanced modulator 100 for smooth and accurate degenerative feedback control of the excitation of toroidal coils 91 and 92. While a similar low pass filter may be incorporated in the measure circuit to provide a measure signal of averaged value, the characteristics of galvanometric recorders which are suitably used as the indicating means 55 have a response time which effects the desired averaging of the indications.

Figure 9:
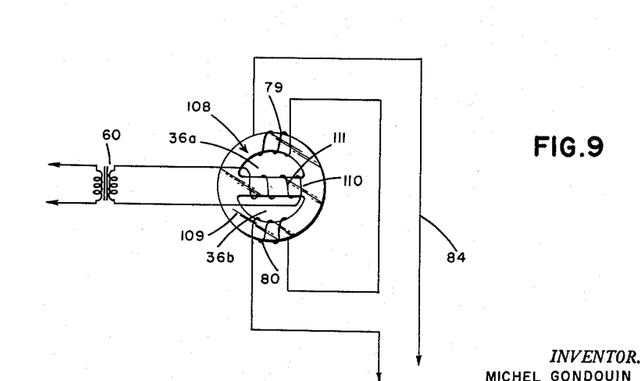
FIG. 9 is a schematic representation of a saturable magnetic core which may be utilized in lieu of a pair of spaced toroidal cores in a modification of the preceding embodiments of the invention.

The several embodiments described above are merely exemplary and may be subject to many modifications within the spirit and scope of the invention as defined in the appended claims. For example, there may be substituted for the pair of toroidal coils 47, 48 (or 47', 48') the coil 108 of FIG. 9 which has a core with a toroidal portion 109 bridged by an integral diametral leg portion 110, the core material again having a rectangular hysteresis characteristic. Two passages 36a and 36b are thus formed with a magnetic circuit encircling each. A single primary winding 111 is wound on the leg portion 110 and has its terminals connected across the terminals of the secondary winding of transformer 60. The secondary windings 79 and 80 are wound on the toroidal core portion 109 in the same direction but on opposite sides of the leg portion 110. Since the secondary windings 79 and 80 are again connected in series aiding relation by the conductor 84 but are threaded by flux circulating the respective magnetic circuits in opposite directions, the signals induced in the secondary windings 79, 80 when the primary winding 111 is energized by oscillator 58 have the same dependence upon the flow of direct current through the passages 36a, 36b as the corresponding signals obtained with the apparatus of FIG. 7 or FIG. 8. In the apparatus of FIG. 8, one of toroidal coils 91, 92 may be eliminated, if desired, although a symmetrical arrangement afforded by the two coils may be preferred in some instances.

Accordingly, the invention is not to be limited to the embodiments shown and described but is of a scope defined in the appended claims.

I claim:

1. In apparatus for investigating earth formations traversed by a borehole containing conductive fluid, the combination comprising saturable magnetic core means including two magnetic circuits each having a current flow passage therethrough, means for moving said magnetic core means through a borehole for enabling spontaneous earth currents to flow through said current flow passage, windings inductively coupled with each of said magnetic circuits, means for alternately driving said magnetic circuits in to their opposite saturation states to induce a series of pulses in each of said windings which have a time spacing dependent upon the magnitude and direction of said spontaneous earth currents, means for combining the pulses from said windings, and means responsive to the combined pulses for providing an indication of the magnitude and direction of said spontaneous earth currents.

2. In apparatus for investigating earth formations traversed by a borehole containing conductive fluid, the combination comprising saturable magnetic core means including two magnetic circuits each having a current flow passage therethrough, means for moving said magnetic core means through a borehole for enabling spontaneous earth currents to flow through said current flow passage, a separate winding inductively coupled with each of said magnetic circuits, means for alternately driving said magnetic circuits into their opposite saturation states to induce a series of pulses in each of said windings which having a time spacing dependent upon the magnitude and direction of said spontaneous earth currents, means for combining the pulses from said windings, means responsive to the combined pulses for passing unidirectional current through said core means in a direction opposite to the flow of said spontaneous earth current for reducing the combination of the pulses induced in said windings substantially to zero, and means responsive to said unidirectional current for providing an indication of said spontaneous earth current.

3. In apparatus for investigating earth formations traversed by a borehole containing conductive fluid, the combination comprising a pair of saturable toroidal cores, insulating means defining a current flow passage through the centers of said cores, means for moving said toroidal cores and insulating means through a borehole for enabling spontaneous earth currents to flow through said current flow passage, windings on each of said cores, and means for alternately driving each of said cores into their opposite saturation states to induce a series of pulses in each of said windings which have a time spacing dependent upon the magnitude and direction of spontaneous earth current passing through said passage, means for combining the pulses from said windings, and means responsive to the combined pulses for providing an indication of the magnitude and direction of said spontaneous earth currents.

4. In apparatus for investigating earth formations traversed by a borehole containing conductive fluid, the combination comprising a pair of saturable toroidal cores, insulating means defining a passage through the centers of said cores, means for moving said toroidal cores and insulating means through a borehole for causing borehole fluid to fill said passage for enabling spontaneous earth current to flow therethrough, windings on each of said cores, means for alternately driving each of said cores into their opposite saturation states to induce a series of pulses in each of said windings which have a time spacing dependent upon the magnitude and direction of spontaneous earth current passing through said passage, means for combining the pulses from said windings, feedback means responsive to said combined pulses and arranged to pass a current linked with said cores for diminishing the combination of the pulses induced in said windings substantially to zero, and means responsive to said feedback current for providing an indication of said spontaneous earth current.

5. In apparatus for investigating earth formations traversed by a borehole containing conductive fluid, the combination comprising a housing having an insulating portion resiliently sealing with the borehole wall and defining a passage extending longitudinally along the borehole and having openings at both ends thereof for enabling entry of said conductive fluid, a pair of saturable toroidal cores secured to said housing encircling and spaced along said passage and having windings thereon, means for moving said housing through the borehole for enabling spontaneous earth current to flow through said passage, means for alternately driving each of said cores into their opposite saturation states to induce a series of pulses in each of said windings, means for combining the pulses from said windings, means responsive to the combined pulses for passing direct current through said passage for substantially nullifying the net current flowing therethrough, and means responsive to the potential within said passage when the net direct current is substantially nullified for providing indications representing the variation of spontaneous earth potential along the borehole.

6. In apparatus for investigating earth formations traversed by a borehole containing conductive fluid, the combination comprising a pair of saturable toroidal cores, insulating means defining a current flow passage through the centers of said cores, means for moving said toroidal cores and insulating means through a borehole for enabling spontaneous earth current to flow through said current flow passage, circuit means including electric source means for oppositely driving said cores alternately between their opposite saturation states, windings inductively coupled to said cores for developing a series of pulses in each of such windings having a time spacing dependent upon the amplitude and polarity of the spontaneous earth current flowing through said passage, means for combining the pulses from said windings, rectifier means responsive to the combined pulses for deriving a D.C. potential having an amplitude and polarity corresponding to the amplitude and polarity of the spontaneous earth current flowing through said passage, and means responsive to said D.C. potential for providing indications of said spontaneous earth current.

7. In apparatus for investigating earth formations traversed by a borehole containing conductive fluid, the combination comprising a pair of saturable toroidal cores, insulating means defining a current flow passage through the centers of said cores, means for moving said toroidal cores and insulating means through a borehole for enabling spontaneous earth currents to flow through said current flow passage, a balancing winding on said cores, means for oppositely driving said cores alternately between their opposite states of saturation, windings inductively coupled with said cores for developing a series of pulses in each of such windings having a time spacing dependent upon the amplitude and polarity of the spontaneous earth current flowing through said passage, means for combining the pulses from said windings, rectifier means responsive to the combined pulses for passing a direct current through said balancing winding substantially equal and opposite to the spontaneous earth current flowing through said passage, and means responsive to the current in said balancing winding for providing indications which are a function of the spontaneous earth current flowing through said passage.

8. In apparatus for investigating earth formations traversed by a borehole containing conductive fluid, the combination comprising a pair of saturable toroidal cores, insulating means defining a passage through the centers of said cores extending longitudinally along the borehole and having openings at either end thereof for enabling entry of said conductive fluid, means for moving said toroidal cores and insulating means through the borehole for enabling spontaneous earth currents to flow through said passage, said spontaneous earth currents being essentially unidirectional at any given point along the borehole, means for alternately driving each of said cores into their opposite saturation states, windings inductively coupled to said cores for developing a series of pulses in each of such windings having a time spacing dependent upon the magnitude and direction of unidirectional current flowing through said passage, means for combining the pulses from said windings, feedback circuit means responsive to said combined pulses for establishing substantially a zero potential gradient along said passage, and means responsive to the potential difference between a point along said passage and a remote reference point for deriving indications characteristic of the formations.

9. In apparatus for investigating earth formations traversed by a borehole containing conductive fluid, the combination as defined in claim 8 wherein said feedback means for establishing substantially a zero potential gradient includes electrodes spaced along said passage on either side of said point therein and feedback amplifier means for passing unidirectional current between said electrodes in a direction opposite to the flow of spontaneous earth current.

10. In apparatus for investigating earth formations traversed by a borehole containing conductive fluid, the combination as defined in claim 8, wherein said feedback means for establishing substantially a zero potential gradient includes at least one toroidal coil spaced along said passage and means for energizing said toroidal coil with a sawtooth current.

11. In borehole investigating apparatus, the combination comprising: magnetic core means; means for moving said magnetic core means through a borehole for intercepting unidirectional magnetic flux present therein; a coil winding encircling at least a portion of said core means; circuit means for energizing said coil winding for inducing periodic magnetic flux variations in said core means; and circuit means responsive to said flux variations for providing an indication of any change in said flux variations for providing a measure of said unidirectional flux.

12. In borehole investigating apparatus, the combination comprising: saturable magnetic core means; means for moving said magnetic core means through a borehole for intercepting unidirectional magnetic flux present therein; circuit means for driving said magnetic core means back and forth between opposite saturation states to develop therein a series of magnetic flux impulses; and circuit means responsive to said flux impulses for providing an indication of any change in the time spacing between such impulses for providing a measure of said unidirectional flux.

13. In apparatus for investigating earth formations traversed by a borehole containing conductive fluid, the combination comprising: magnetic core means; means for moving said magnetic core means through a borehole for intercepting unidirectional magnetic flux associated with the flow of spontaneous earth currents in the borehole; a coil winding encircling at least a portion of said core means; circuit means for energizing said coil winding for inducing periodic magnetic flux variations in said core means; and circuit means responsive to said flux variations for providing an indication of any change in said flux variations for providing a measure of said spontaneous earth currents.

14. In apparatus for investigating earth formations traversed by a borehole containing conductive fluid, the combination comprising: saturable magnetic core means; means for moving said magnetic core means through a borehole for intercepting unidirectional magnetic flux associated with the flow of spontaneous earth currents in the borehole; a coil winding encircling at least a portion of said core means; circuit means for energizing said coil winding for driving said core means back and forth between opposite saturation states to develop therein a series of magnetic flux impulses; and circuit means responsive to said flux impulses for providing an indication of any change in timing thereof for providing a measure of said spontaneous earth currents.

15. In apparatus for investigating earth formations traversed by a borehole containing conductive fluid, the combination comprising: a saturable magnetic toroidal core; means for moving said toroidal core through a borehole with the toroid axis parallel to the borehole axis for intercepting unidirectional magnetic flux associated with the flow of spontaneous earth currents in the borehole; a coil winding encircling at least a portion of said core; circuit means for energizing said coil winding for driving said core back and forth between opposite saturation states to develop therein a series of magnetic flux impulses; and circuit means coupled to said core and responsive to any change in timing of said flux impulses for providing a measure of said spontaneous earth currents.

16. In apparatus for investigating earth formation traversed by a borehole containing conductive fluid, the combination comprising: a pair of saturable magnetic toroidal cores; means for moving said toroidal cores through a borehole in near proximity to one another with the toroid axes parallel to the borehole axis for intercepting unidirectional magnetic flux associated with the flow of spontaneous earth currents in the borehole; a coil winding encircling at least a portion of each of said cores; circuit means for energizing said coil windings for oppositely driving said cores back and forth between opposite saturation states to develop in each a series of magnetic flux impulses; circuit means coupled to said cores and responsive to both sets of said flux impulses for providing a combined impulse signal; and means responsive to said combined impulse signal for providing an indication of said spontaneous earth currents.

17. In apparatus for investigating earth formations traversed by a borehole containing conductive fluid, the combination comprising: magnetic core means; first and second electrodes positioned above and below said core means; a third electrode positioned near said core means; means for moving said core means and electrodes in unison through a borehole for enabling said core means to intercept unidirectional magnetic flux associated with the flow of spontaneous earth currents in the borehole; a coil winding encircling at least a portion of said core means; circuit means for energizing said coil winding for inducing periodic magnetic flux variations in said core means; circuit means responsive to any change in said flux variations for energizing said first and second electrodes with unidirectional potentials for minimizing the flow of said spontaneous earth currents in the vicinity of said core means; and means coupled to said third electrode for providing an indication of the spontaneous earth potential in the vicinity of said core means.

18. In apparatus for investigating earth formations traversed by a borehole containing conductive fluid, the combination comprising: an insulated housing having an insulated fluid-flow passage extending in a longitudinal borehole direction therethrough with outlets at both ends thereof and insulating means encircling the housing exterior for resiliently sealing with the borehole wall; a saturable magnetic toroidal core secured to said housing encircling said passage; a coil winding encircling at least a portion of said toroidal core; means for moving said housing through the borehole for enabling spontaneous earth current to flow through said passage, said toroidal core intercepting unidirectional magnetic flux associated with the spontaneous earth current flowing through said passage; circuit means for energizing said coil winding for inducing periodic magnetic flux variations in said toroidal core; and circuit means responsive to said flux variations for providing an indication of any change in said flux variations for providing a measure of said spontaneous earth current.

References Cited in the file of this patent

UNITED STATES PATENTS

| | | |
|---|---|---|
| 2,415,808 | Buckley | Feb. 18, 1947 |
| 2,542,057 | Relis | Feb. 20, 1951 |
| 2,661,455 | Tickner | Dec. 1, 1953 |
| 2,739,285 | Windsor | Mar. 20, 1956 |
| 2,755,434 | Yetter | July 17, 1956 |
| 2,780,781 | Medlar | Feb. 5, 1957 |
| 2,795,759 | Rezek | June 11, 1957 |